(12) United States Patent
Kim

(10) Patent No.: US 6,225,360 B1
(45) Date of Patent: May 1, 2001

(54) METHOD AND SYSTEM FOR RECOVERING POLYETHYLENE FROM WASTE RESIN-COMPOUNDS

(75) Inventor: Sung-moon Kim, Kunpo (KR)

(73) Assignee: Kwang Kim, Sungnam (KR)

( * ) Notice: Subject to any disclaimer, the term of this patent is extended or adjusted under 35 U.S.C. 154(b) by 0 days.

(21) Appl. No.: 09/334,573

(22) Filed: Jun. 21, 1999

(30) Foreign Application Priority Data

Jun. 20, 1998 (KR) .................................................. 98-23262

(51) Int. Cl.⁷ ...................................................... C08J 11/04
(52) U.S. Cl. ................................ 521/47; 521/40; 521/405
(58) Field of Search ................................. 134/38; 521/40, 521/40.5, 46.5, 47, 48; 528/493, 497, 503, 502 A

(56) References Cited

U.S. PATENT DOCUMENTS

| | | | |
|---|---|---|---|
| 4,071,479 | * | 1/1978 | Broyde et al. ........................ 260/2.3 |
| 4,164,484 | * | 8/1979 | Tokuda et al. ........................ 260/2.3 |
| 4,366,006 | * | 12/1982 | Ferer et al. ............................ 134/38 |
| 5,041,469 | * | 8/1991 | Ostetler et al. ....................... 521/189 |
| 5,185,429 | * | 2/1993 | Cinquina et al. ..................... 528/503 |
| 5,198,471 | * | 3/1993 | Nauman et al. ..................... 521/46.5 |
| 5,674,914 | * | 10/1997 | Abe et al. ........................... 521/46.5 |
| 5,994,417 | * | 11/1999 | Roberts et al. ..................... 521/49.5 |

FOREIGN PATENT DOCUMENTS

| | | |
|---|---|---|
| 6287350 | 10/1994 | (JP) . |
| 873646 | 3/1996 | (JP) . |
| 9169868 | 6/1997 | (JP) . |
| 9179651 | 7/1997 | (JP) . |
| 9208738 | 8/1997 | (JP) . |
| 894486 | 11/1989 | (KR) . |
| 917451 | 9/1991 | (KR) . |
| 958071 | 4/1995 | (KR) . |

\* cited by examiner

*Primary Examiner*—Edward J. Cain
*Assistant Examiner*—Katarzyna Wyrozebski-Lee
(74) *Attorney, Agent, or Firm*—Rothwell, Figg, Ernst & Manbeck

(57) ABSTRACT

Method and system for recovering polyethylene from a polyethylene-containing scrap material. The recovery method includes the steps of putting the scrap material containing polyethylene into a solvent mixture containing a polyethylene-soluble solvent and a polyethylene-insoluble solvent in a ratio of 1:1~1:3 based on volume, heating the mixture at a temperature of 60~145° C. to dissolve the polyethylene from the scrap material, resulting in a mixture of a polyethylene solution and insoluble substances. Then, the resulting mixture is filtered to separate the polyethylene solution and the insoluble substances, and polyethylene is deposited by cooling the separated polyethylene solution. Then, a mixture of the polyethylene deposition and the solvent mixture is filtered to separate the polyethylene deposition. Therefore, a huge amount of polyethylene-containing scrap material can be continuously processed, without generation of harmful materials, and can simply recover a high-quality PE at low cost.

5 Claims, 4 Drawing Sheets

METHOD AND SYSTEM FOR RECOVERING POLYETHYLENE FROM WASTE RESIN-COMPOUNDS

BACKGROUND OF THE INVENTION

1. Field of the Invention

The present invention relates to both method and system for recovering polyethylene from scrap material containing polyethylene.

2. Description of the Related Art

With the development of the the petrochemical industry, the production of various synthetic resins such as polyethylene, polypropyrene and polyvinylchloride, which originate from petroleum, has increased.

In particular, use of polyethylene among those synthetic resins has become widespread as a material for various household goods, protective cases for goods, parts thereof, other synthetic fibers, non-woven fabric or wrapping material.

Using products made of polyethylene enables humans to enjoy convenient daily life. However, industrial wastes originating from synthetic resins during the production of goods, or wastes goods made of synthetic resin raises a problem of environmental pollution. That is, air or soil pollution may become serious by incinerating or burying the waste of synthetic resin. Also, the continuous disposal of synthetic resin made from a limited amount of petroleum appears to be draining the petroleum supply, with a possible result being an end to growth in the synthetic resin industry.

Accordingly, a method for recovering synthetic resin from scrap material has been suggested so as to solve the above problems.

For example, Korean Patent Publication No. 89-4486 discloses methods for separating and recovering polyethylene from scrap thin metal plates coated with polyethylene resin. In the above disclosure, the thin metal plate covered with polyethylene resin is cut into an appropriate size for processing, and heated to a temperature higher than the melting point of polyethylene, to melt the polyethylene resin. As a result, the polyethylene resin is separated from the thin metal plate. However, in the polyethylene separation method, the entire system must be maintained at a high temperature to completely separate the molten polyethylene having a high viscosity from the thin metal plate, so that energy consumption increases. Also, the method is not suitable for scrap thermosetting resin or compound synthetic resin having synthetic resins whose difference in melting points is not great.

In addition, Korean Patent Publication No. 91-7451 and Laid-open Publication No. 95-8071 disclose methods for separating and recovering polyethylene resin using polyethylene-soluble solvent from scrap electric cables coated with polyethylene resin. Also, Japanese Patent Laid-open Publication No. 6-287350 discloses methods for separating and recovering polyolefin using polyolefin-soluble solvent from scrap materials containing polyolefin.

However, in the case of separating polyethylene from scrap materials only using a solvent as in the above disclosures, the polyethylene solution must be heated to a temperature higher than the boiling point of the polyethylene-soluble solvent, so as to separate the solvent. That is, if the polyethylene solution having only polyolefin-soluble solvent is cooled, polyethylene swells and is gelated in the solvent, thus it is difficult to separate polyethylene by filtration. However, evaporating the solvent requires much heat energy. Also, as the solvent evaporates, the concentration of polyethylene in the polyethylene solution relatively increases, so that the evaporation of solvent is hindered. Accordingly, a considerable amount of solvent remains in the recovered polyethylene. Thus, the quality of recovered polyethylene is lowered. Also, due to the incomplete recovery of the solvent, the production cost increases and the entire process becomes longer.

Japanese Patent Laid-open Publication No. 9-208738 discloses methods for depositing and recovering polyolefin from scrap materials containing polyolefin, in which polyolefin is dissolved in a polyolefin-soluble solvent, an insoluble component is removed from the mixture, and then a depositing agent or a poor solvent is added to polyolefin solution. However, extra processes for separating the polyolefin-soluble solvent and the depositing agent or poor solvent are required, so that energy consumption and the production cost increases in addition to the entire process being longer.

SUMMARY OF THE INVENTION

It is an object of the present invention to provide a method for recovering polyethylene from scrap materials containing polyethylene, in which a huge amount of scrap material containing polyethylene can be continuously disposed of without discharge of harmful substances, and high-quality polyethylene is easily recovered at low cost.

It is another object of the present invention to provide a system for recovering polyethylene from scrap materials containing polyethylene, in which a huge amount of scrap material containing polyethylene can be continuously disposed of without discharge of harmful substances, and high-quality polyethylene is easily recovered at low cost.

Accordingly, to achieve the first object of the present invention, there is provided a method for recycling polyethylene from scrap material containing polyethylene, comprising the steps of putting the scrap material containing polyethylene into a solvent mixture containing a polyethylene-soluble solvent and a polyethylene-insoluble solvent in a ratio of 1:1~1:3 based on volume, heating the mixture at a temperature of 60~145° C. to dissolve the polyethylene from the scrap material, resulting in a mixture of a polyethylene solution and insoluble substances. The resulting mixture is filtered to separate the polyethylene solution and the insoluble substances and polyethylene is deposited by cooling the separated polyethylene solution. Then, a mixture of the polyethylene deposition and the solvent mixture is filtered to separate the polyethylene deposition.

Preferably, the polyethylene-containing scrap material comprises at least one resin selected from the group consisting of polyvinylchloride, nylon and polyester.

To achieve the second object of the present invention, there is provided a system for recovering polyethylene from scrap material containing polyethylene, comprising a heating and dissolving unit, a first filter, a cooling and depositing unit and a second filter. The heating and dissolving unit is for dissolving the polyethylene from the polyethylene-containing scrap material into a solvent mixture, resulting in a mixture of a polyethylene solution and insoluble substances. The first filter filters the insoluble substances from the resulting mixture formed by the heating and dissolving unit, and the cooling and depositing unit cools the polyethylene solution contained in the heating and dissolving unit and the remaining polyethylene solution after filtration of the insoluble substances by the first filter, to deposit polyethylene, resulting in a mixture of the polyethylene deposition and the solvent mixture. The second filter filters the polyethylene deposition from the mixture obtained by the cooling and depositing unit.

Preferably, the recovery system further comprises a first drying unit for drying the insoluble substances obtained from the first filter by evaporating the remaining solvent mixture, a first condenser for condensing the remaining solvent mixture evaporated by the first drying unit, a second drying unit for evaporating the remaining solvent mixture from the polyethylene deposition obtained by the second filter, and a second condenser for condensing the remaining solvent mixture evaporated by the second drying unit.

Preferably, the system for recoverying polyethylene from a polyethylene-containing scrap material further comprises a heat exchanger for heat exchange between the polyethylene solution provided from the heating and dissolving unit and the first filter to the cooling and depositing unit, and the solvent mixture provided from a solvent tank to the heating and dissolving unit.

Preferably, at least one of the heating and dissolving unit, the first drying unit and the second drying unit further comprise an airtight screw feeder having a screw shaft with helical blade formed along only a part of a screw shaft, near a material drop, in order to prevent efflux of the solvent mixture from the heating and dissolving unit, the first drying unit and/or the second drying unit.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
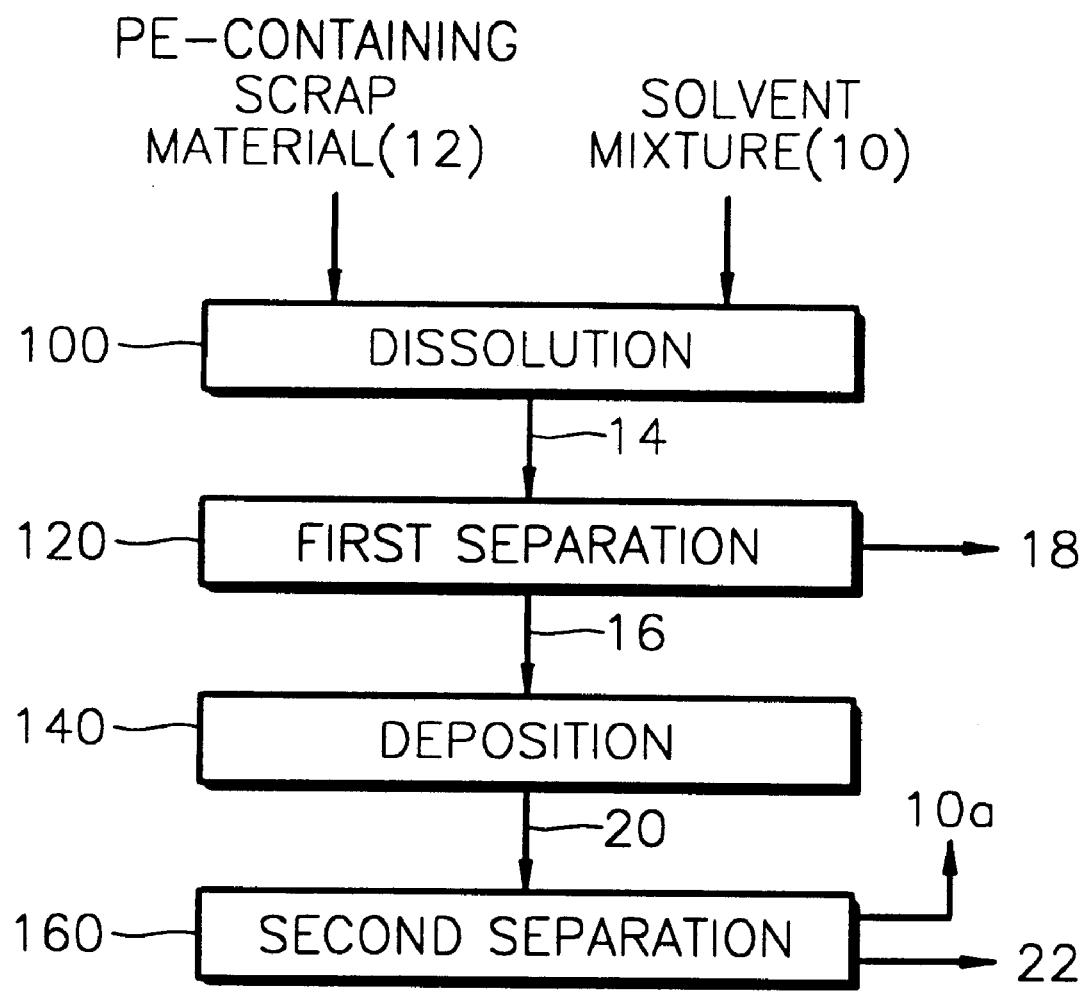
FIG. 1 is a block diagram of a method for recovering polyethylene (PE) from a PE-containing scrap material according to a preferred embodiment of the present invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the same reference numerals represent the same elements.

Referring to FIG. 1, in a method for recovering polyethylene from scrap materials containing polyethylene according to a preferred embodiment of the present invention, polyethylene(PE)-containing scrap material 12 is put into a solvent mixture 10 containing a PE-soluble solvent and a PE-insoluble solvent in a ratio of 1:1~1:3 based on volume, and heated at 60~145° C., so that the polyethylene is dissolved in the solvent mixture 10, resulting in a mixture 14 of a PE solution and insoluble substances (step 100).

The reason why the mixing ratio of the PE-soluble solvent and the PE-insoluble solvent is 1:1 at the minimum is to reduce the degree of swelling of the PE deposition in the solvent mixture in a PE deposition step 140, such that filtration and drying of the PE deposition become easy. Also, the reason why the mixing ratio of the PE-soluble solvent and the PE-insoluble solvent is 1:3 at the maximum is almost all dissolve the PE.

The PE-soluble solvent may comprise at least one hydrocarbon solvent selected from the group consisting of benzene, toluene, xylene and solvent naphtha.

Also, the PE-insoluble solvent may comprise at least one which is miscible with the PE-soluble solvent selected from the group consisting of ethylacetate, methylisobutylketone, methylethylketone, dioxane, 2-ethylbutylacetate and methyl n-amylketone. Unless the PE-insoluble solvent is miscible with the PE-soluble solvent, the PE-insoluble solvent is separated from the PE-soluble solvent, with the result that the degree of swelling of the PE deposition will increase as the PE solution is cooled.

Also, the reason why the heating temperature of the mixture of the PE-containing scrap material and the solvent mixture 10 ranges from 60° C. to 145° C. is that the PE may be not dissolved well in the solvent mixture 10 at a temperature lower than 60° C. and the boiling point of the solvent mixture 10 may be near 145° C. The PE-containing scrap material 12 may comprise at least one resin selected from the group consisting of polyvinylchloride, nylon and polyester. Preferably, the PE-containing scrap material 12 is a mat for vehicles, which comprises a PE base and polyester fibers stuck to the PE base.

Figure 2:
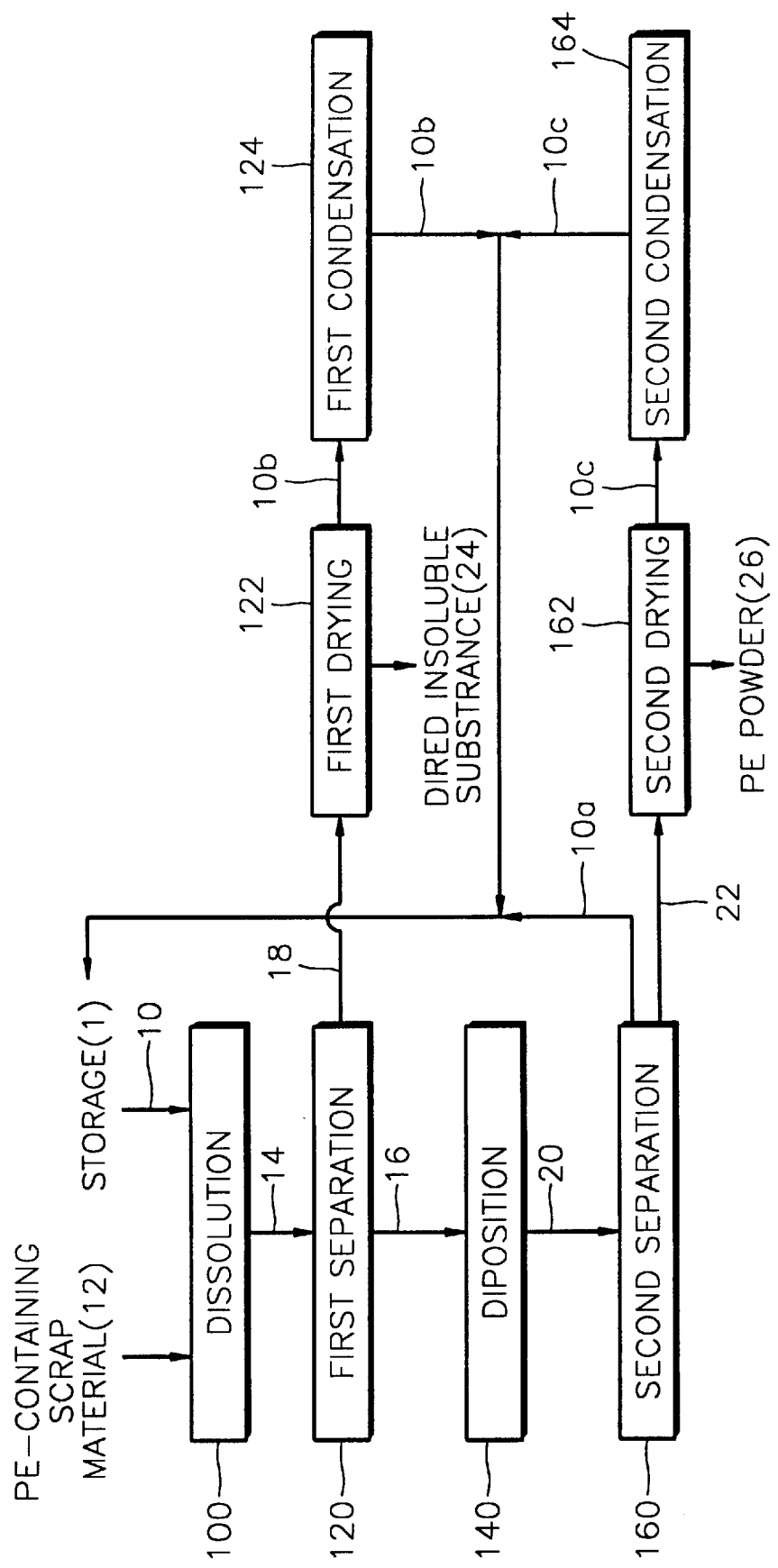
FIG. 2 is a block diagram of a method for recovering PE from a PE-containing scrap material according to another preferred embodiment of the present invention.

After the step 100, the mixture 14 is filtered to separate the insoluble substances 18 and the PE solution 16 (step 120). Then, the separated PE solution 16 is cooled at a temperature of 50° C. or less to deposit PE (step 140). Lastly, a mixture 20 of the PE deposition and the solvent mixture are filtered in the step 160 so as to separate the PE deposition 22 and the solvent mixture (10a). FIG. 2 is a block diagram of a method for recovering PE from a PE-containing scrap material according to another embodiment of the present invention. The steps 100 through 160 are the same as those as in the first embodiment.

Referring to FIG. 2, after the first separation step 120, the insoluble substances 18 are dried so as to recover the remaining solvent mixture, resulting in dried insoluble substances 24 (step 122). Also, an evaporated solvent mixture 10b is condensed in the step 124.

After the step 160, the PE deposition 22 is dried so as to recover the solvent mixture remaining in the deposition. That is, the separated PE deposition 22 is dried, resulting in a powdered PE 26, and an evaporated solvent mixture 10c is condensed in the step 164.

The solvent mixture 10c condensed in the second condensation step 164 are mixed with the solvent mixture 10b condensed in the first condensation step 124, and recirculated into a storage tank 1 together with the solvent mixture 10a separated in the second separation step 160.

The method for recovering PE from a PE-containing scrap material according to the present invention is not limited to only the PE-containing scrap material, and can be applied to scrap materials containing different resins from PE by changing the composition of the solvent mixture according to type of resin contained in the scrap material.

Figure 3:
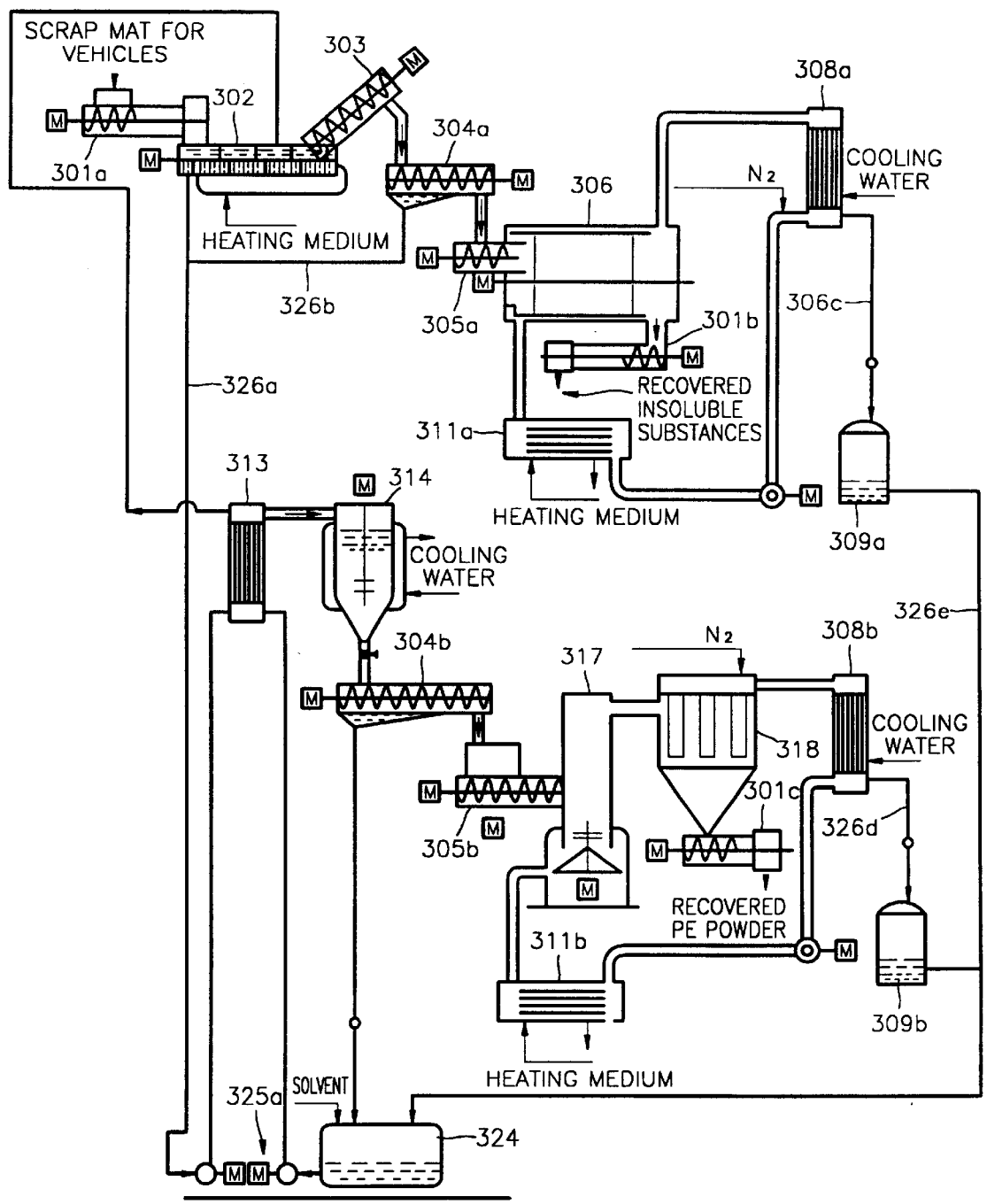
FIG. 3 is a process diagram illustrating unit process in a system for recovering PE from a PE-containing scrap material according to a preferred embodiment of the present invention.
Figure 4:
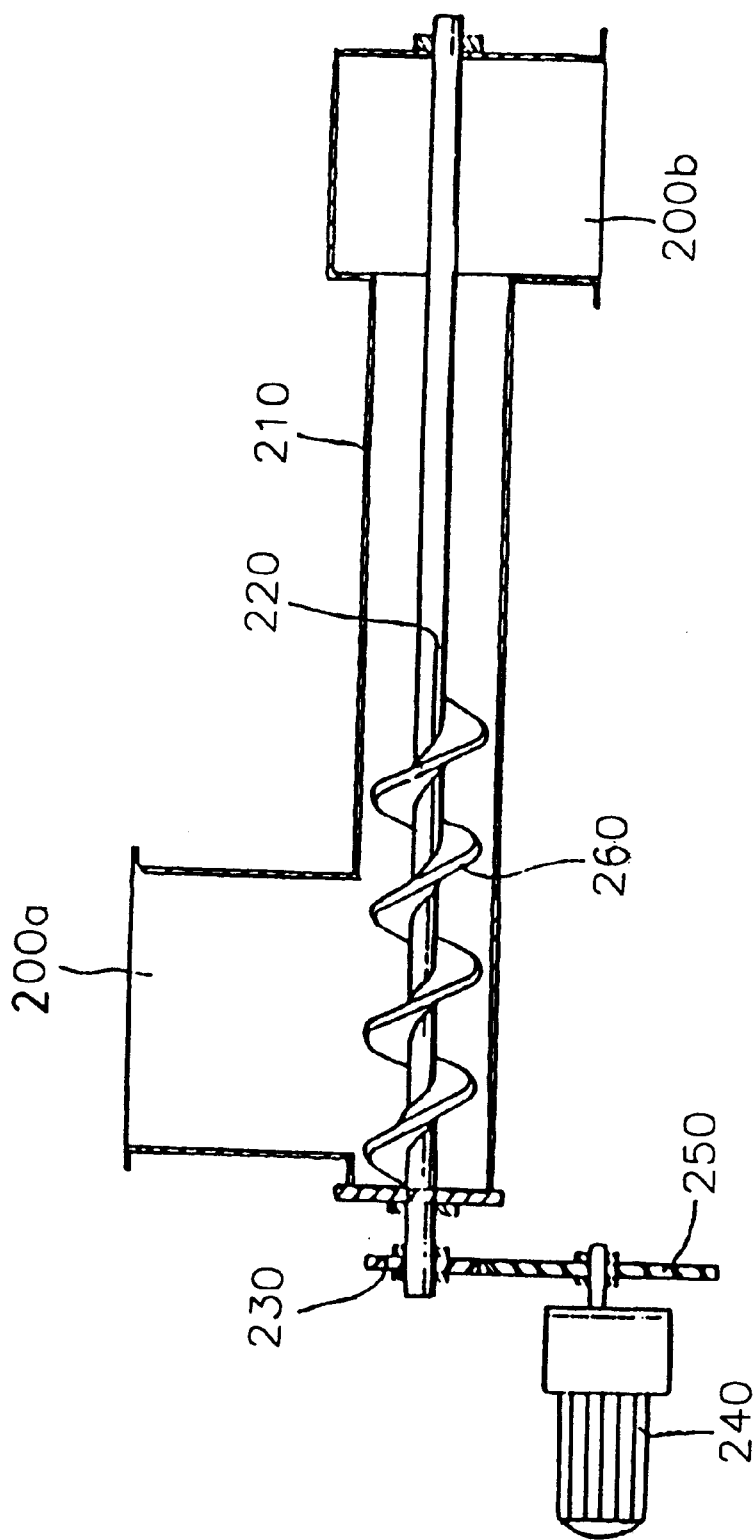
FIG. 4 is a vertical sectional view showing the structure of an airtight screw feeder which may be adopted in the heating and dissolving unit, the first drying unit or the second drying unit shown in FIG. 3.

FIG. 3 illustrates unit process in a system for recovering PE from a PE-containing scrap material according to a preferred embodiment of the present invention, and FIG. 4 is a vertical sectional view of an airtight screw feeder which may be adopted in the system shown in FIG. 3.

A system for recovering PE from a PE-containing scrap material according to an embodiment of the present invention, which can be adopted for the recovery method illustrated with reference to FIG. 1, will now be described with reference to FIGS. 3 and 4.

In FIG. 3, reference numeral 302 represents a heating and dissolving unit, reference numeral 304a represents a first screw press, reference numeral 314 represents a cooling and depositing unit, and reference numeral 304b represents a second screw compressor.

Referring to FIG. 3, a scrap mat for vehicles, which is formed by sticking polyester fibers to a polyethylene base, and is cut into a smaller size, is put into an airtight screw feeder 301a having marerial drop, and the scrap material is provided to a heating and dissolving unit 302, which is kept airtight from the material drop.

Referring to FIG. 4, an example of the airtight screw feeder adopted in the system for recovering PE from a PE-containing scrap material comprises a hopper type material drop 200a at one end, which is open upwards, for smoothly supplying the material to the screw feeder, and a cylindrical housing 210 integrated with the material drop 200a, which extends in a lateral direction from the bottom of the material drop 200a.

Also, the airtight screw feeder shown in FIG. 4 has a hopper type discharge hole 200b at the other end thereof, which is open downwards toward the opposite direction to the screw feeder 200a.

A screw shaft 220 which is freely rotatable, is installed in the housing 210, and a driving gear 250 driven by a variable speed motor 240 and a driven gear 230 interlocked with the driving gear 250 are attached to one end of the screw shaft 220. A helical blade 260 is formed at only a part of the leading end of the screw shaft 200, which is near the material drop 200a, having a width slightly narrower than the inner diameter of the housing 210. Thus, the material provided via the material drop 200a is compressed at a middle part of the housing 210, thereby airtightening between the material drop 200a and the discharge hole 200b. As a result, the system for recovering PE from a PE-containing scrap material, having the airtight screw feeder, does not discharge solvent to the outside, so that there is no air pollution.

A solvent mixture containing a PE-soluble solvent and a PE-insoluble solvent in a ratio of 1:1~1:3 based on volume is poured into the heating and dissolving unit 302. When the solvent mixture is heated above 60° C., the polyethylene base of the scrap material is dissolved in the solvent mixture. The PE solution is provided to a general heat exchanger 313, under pressure, via a pipeline 326a connected to one end of the bottom of the heating and dissolving unit 302, and via a circulation pump.

The insoluble substances are carried to a first screw press 304a by a screw discharger 303. The first screw press 304a has fine filtering holes in the walls, and a container around the walls, for collecting the PE solution. Thus, when the insoluble substances are pressed, the PE solution remaining in the insoluble substances filters through the fine filtering holes, and is collected in the container. Then, the PE solution is provided to the pipeline 326a of the heating and dissolving unit 302 via a pipe line 326 connected to the bottom of the container.

The insoluble substances filtered by the first screw press 304a is put into a rotary drying unit 306 via a screw feeder 305a, completely dried using a high-temperature nitrogen gas, and recovered by an airtight screw feeder 301b.

The nitrogen gas containing solvent mixture evaporated by the rotary drying unit 306 is carried to a first condenser 308a. Here, the evaporated solvent mixture is condensed by the first condenser 308a and carried to a first receiver tank 309 via a pipeline 326c, and the nitrogen gas is circulated to the rotary drying unit 306 via a turbo blower and the first heater 311a.

The first receiver tank 309a for storing the solvent mixture recovered by the first condenser 308a is connected to a solvent tank 324 by a pipe line 326e. Thus the solvent mixture contained in the first receiver tank 309a is circulated to the heating and dissolving unit 302 via the solvent tank 324, a solvent pump 325a installed at the drain of the solvent tank 324, and a heat exchanger 313 in sequence.

After cooled in the heat exchanger 313, the PE-solution is further cooled to below 50° C. in a cooling and depositing unit 314, resulting in a mixture of the PE deposition and the solvent mixture. The crystalline PE deposition is filtered by a second screw press 304b. Then, the filtered solvent mixture is recovered in the solvent tank 324, and the obtained polyethylene educt cake is put into a general dryer 317 using stream of gas via a screw feeder 305b.

In the dryer 317, the polyethylene deposition is dried by a high-temperature nitrogen gas and is moved to a bag filter 318 together with a nitrogen gas flow. The polyethylene deposition captured by the bag filter 318 is recovered as dried polyethylene powder through an airtight screw feeder 301c installed below the bag filter 318. The nitrogen gas containing the solvent mixture evaporated from the polyethylene deposition is carried to a second condenser 308b. Here, the solvent mixture evaporated in the dryer 317 is condensed in the second condenser 308b, and carried via a pipeline 326d to a second receiver tank 309b. The nitrogen gas is circulated to the dryer 317 via a turbo blower and a second heater 311b.

The second receiver tank 309b in which the solvent mixture recovered by the second condenser 308b is contained is connected to the solvent tank 324 by a pipeline 326e, so that the solvent mixture contained in the second receiver tank 309a is carried to the solvent tank 324, and then supplied to the heat exchanger 313 via the solvent pump 325a installed at the drain of the solvent tank. Eventually, the solvent mixture is recirculated to the heating and dissolving unit 302.

In the system for recovering PE from a PE-containing scrap material according to a preferred embodiment of the present invention, the internal pressure of the heating and dissolving unit, the first filter, the cooling and depositing unit and the second filter may be lower than the external ambient in order to prevent the efflux of the solvent mixture from the system. The solvent mixture sucked from the first filter, the cooling and depositing unit and the second filter by decreasing the internal pressure is guided into a vent pipe (not shown), sucked into a turbo blower and then carried to an absorption tower (not shown), thereby completely recovering the solvent mixture flowing in the vent pipe.

Hereinafter, the present invention will be described in experiment examples 1–3. However, these examples are merely illustrative and the present invention is not limited to those examples.

EXPERIMENT EXAMPLE 1

100 ml of toluene, a PE-soluble solvent, and 200 ml of methylisobutylketone, a PE-insoluble solvent, were put into a 500 ml-Erlenmeyer flask to which a reflux condenser was installed. Then, 20 g of a scrap mat for vehicles, comprising polyester fibers stuck to a polyethylene base in a ratio of approximately 60:40 based on weight, which was cut into a smaller size, was put into the solvent mixture. The solvent mixture was heated at a temperature range of 100~110° C. for about 10 minutes to dissolve the PE.

The resulting mixture containing the PE solution and the resulting insoluble substances were wrapped in a cotton cloth and pressed. Then, the pressed mixture in the cotton cloth is dried, resulting in 11.9 g of insoluble substances containing polyester fibers.

Also, the filtered PE solution was cooled in a cooling bath while being slowly agitated to approximately 45° C., resulting in crystalline polyethylene depositions. The resulting crystalline polyethylene depositions had a particle size ranging from about 80 $\mu$m to about 4,000 $\mu$m, and particularly 65% or more of the depositions has a particle size ranging between about 100~200 $\mu$m. The depositions were small enough to be filtered using a 100-mesh filter, however the depositions were filtered using a suction filter for easy drying because the depositions were apt to cohere to each other, resulting in 7.2 g of polyethylene powder. As a result, 90 wt % of the resulting polyethylene powder had a particle size of about 150~350 $\mu$m.

EXPERIMENT EXAMPLE 2

100 ml of xylene, a PE-soluble solvent, and 140 ml of ethylacetate, a PE-insoluble solvent, were put into a 500 ml-Erlenmeyer flask to which a reflux condenser was installed. Then, 20 g of a scrap mat for vehicles, comprising polyester fibers struck to a polyethylene base in a ratio of approximately 60:40 based on weight, which was cut into a smaller size, was put into the solvent mixture. The solvent mixture was heated at about 80° C. for about 10 minutes to dissolve the PE.

The crystalline polyethylene depositions were obtained, and filtered and dried in the same manner as in Experiment Example 1, resulting in 12.2 g of insoluble substances comprising polyester fibers and 7.1 g of polyethylene powder.

EXPERIMENT EXAMPLE 3

100 ml of toluene, a PE-soluble solvent, and 180 ml of methylisobutylketone, a PE-insoluble solvent, were put into a 500 ml-Erlenmeyer flask to which a reflux condenser was installed. Then, 40 g of a scrap mat for vehicles, comprising polyester fibers stuck to a polyethylene base in a ratio of approximately 60:40 based on weight, which was cut into a smaller size, was put into the solvent mixture. The solvent mixture was heated at about 110° C. for about 10 minutes to dissolve the PE.

The crystalline polyethylene depositions were obtained, and filtered and dried in the same manner as in Experiment Example 1, resulting in 23.5 g of insoluble substances comprising polyester fibers and 14.2 g of polyethylene powder.

It can be understood from the above results that the separation of fine and uniform PE powers from a PE-containing scrap material by the recovery method according to the present invention is almost perfect. The separated and dried insoluble substances comprising polyester fibers can be used as non-woven fabric for interior decoration of vehicles or for sound insulation, by scutching.

The method and system for recycling scrap material containing PE according to the present invention can continuously process a huge amount of PE-containing scrap material, without generation of harmful materials, and can simply recover a high-quality PE at low cost.

Also, because the recycled PE has uniform and fine powdered form, the recycled PE is very useful as a binder for non-woven fabric used for the interior decoration of vehicles, in addition to being as materials for various resin products.

What is claimed is:

1. A method for recovering polyethylene from scrap material containing polyethylene, consisting of the steps of:
   (a) putting the scrap material containing polyethylene into a solvent mixture containing a polyethylene-soluble solvent and a polyethylene-insoluble solvent in a ratio of 1:1~1:3 based on volume, heating the mixture at a temperature of 60~145 degrees C. to dissolve the polyethylene from the scrap material, resulting in a mixture of a polyethylene solution and insoluble substances;
   (b) filtering the resulting mixture of step (a) to separate the polyethylene solution and the insoluble substances,
      drying the separated insoluble substances to evaporate the solvent mixture remaining in the insoluble substance,
      condensing the evaporated solvent mixture, and recirculating the condensed solvent mixture to be used for the dissolution step (a);
   (c) depositing polyethylene by cooling the separated polyethylene solution to 50 degrees C. or less; and
   (d) filtering a mixture of the polyethylene deposition and the solvent mixture, to separate the polyethylene deposition,
      recirculating the filtered solvent mixture for use in the dissolution step (a) and drying the separated polyethylene deposition to evaporate the remaining solvent mixture,
      condensing the evaporated solvent mixture, and
      recirculating the condensed solvent mixture for use in the dissolution step (a).

2. The method of claim 1, wherein the polyethylene-soluble solvent comprises at least one hydrocarbon solvent selected from the group consisting of benzene, toluene, xylene and solvent naphtha.

3. The method of claim 1, wherein the polyethylene-insoluble solvent comprises at least one solvent selected from the group consisting of ethylacetate, methylisobutylketone, methylethylketone, dioxane, 2-ethylbutylacetate, methyl n-amylketone.

4. The method of claim 1, wherein the polyethylene-containing scrap material comprises at least one resin selected from the group consisting of polyvinylchloride, nylon and polyester.

5. The method of claim 4, wherein the polyethylene-containing scrap material is a mat for vehicles formed by sticking polyester fiber to a polyethylene base.

* * * * *